United States Patent

[11] 3,595,372

| [72] | Inventor | Wallace W. Mojden<br>Palos Heights, Ill. |
|---|---|---|
| [21] | Appl. No. | 789,254 |
| [22] | Filed | Jan. 6, 1969 |
| [45] | Patented | July 27, 1971 |
| [73] | Assignee | Fleetwood Systems, Inc.<br>Lyons, Ill. |

[54] CONVEYOR ASSEMBLY
1 Claim, 13 Drawing Figs.

[52] U.S. Cl. ................................................. 198/37
[51] Int. Cl. .............................................. B65g 43/08
[50] Field of Search ........................................ 198/37, 41,
42, 232; 192/125 A

[56] References Cited
UNITED STATES PATENTS
2,555,880  6/1951  Fruechtel ..................... 198/232

2,212,508  8/1940  Brunnhoelzl ................. 198/37
3,417,853  12/1968  Mouden et al. ............. 198/41 X

*Primary Examiner*—Robert G. Sheridan
*Attorney*—Olson, Trexler, Wolters and Bushnell ABSTRACT: Conveyor or transfer apparatus for supplying container ends or similar objects to the operating station of a machine. The conveyor apparatus includes an end roller which is operable to transfer said objects from a conveyor track to a gravity chute, and drive means for said end roller. In order to regulate the supply of objects to said chute, there is provided overload disabling means associated with said drive means and responsive to drag placed on said end roller by an accumulation of objects in said gravity chute, said disabling means being operable to energize and deenergize said drive for the conveyor and thereby effect said regulation of the supply of objects to the gravity chute.

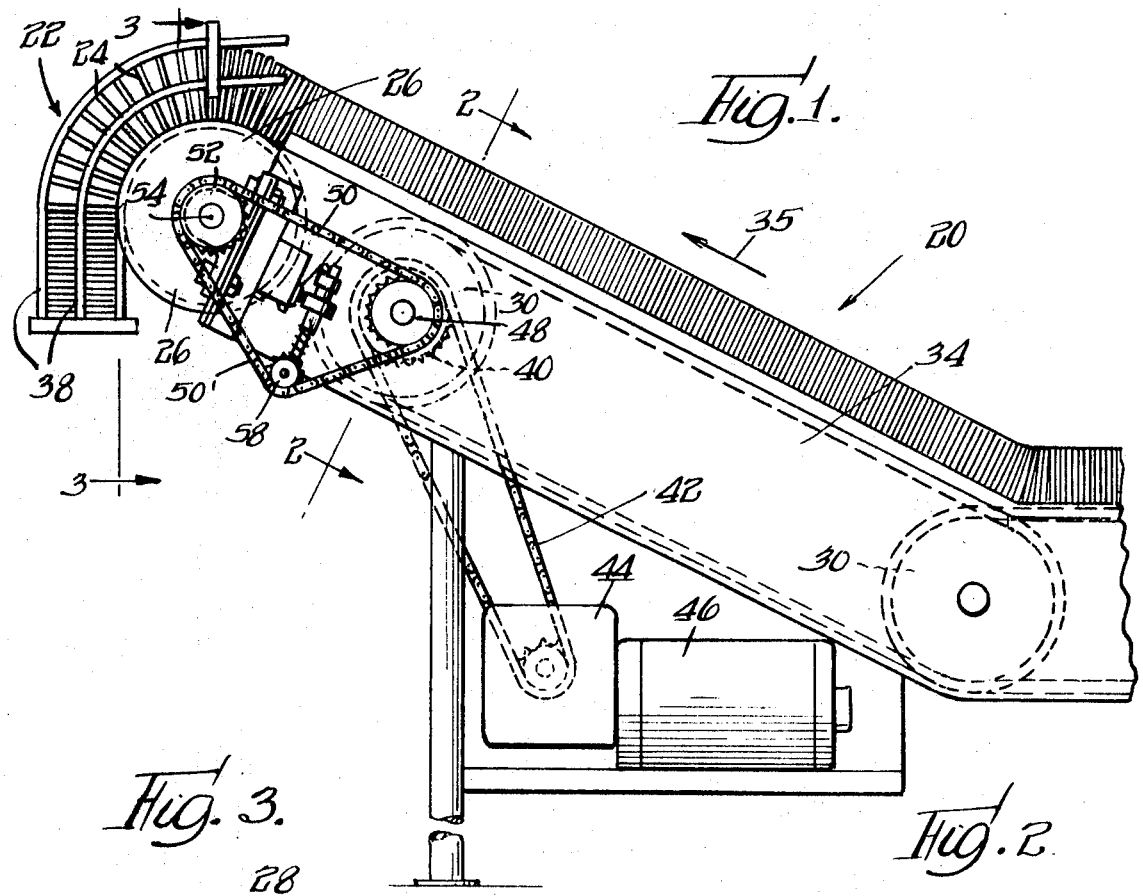

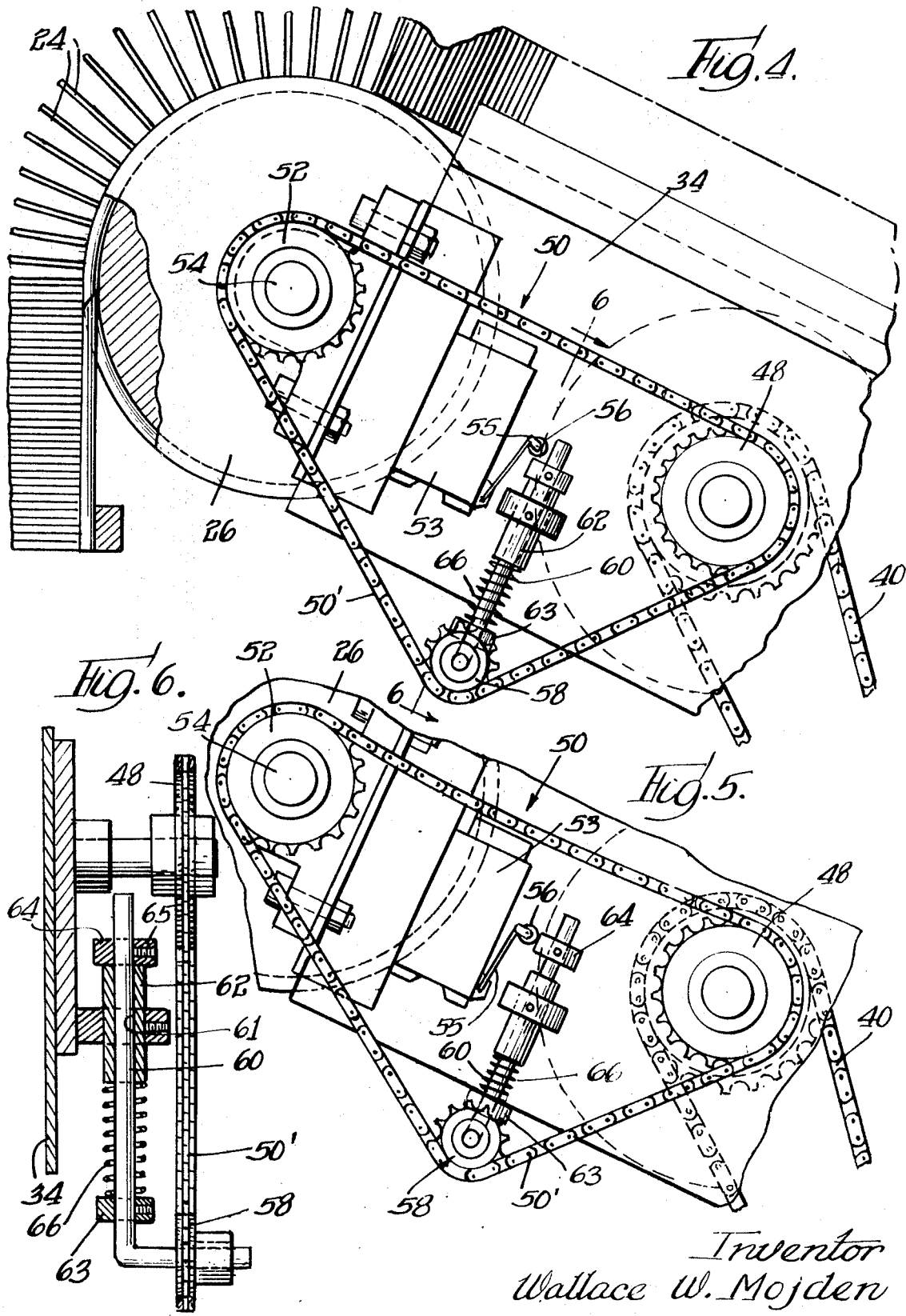

Inventor
Wallace W. Mojden
By Olson, Trexler, Wolters & Bushnell attys

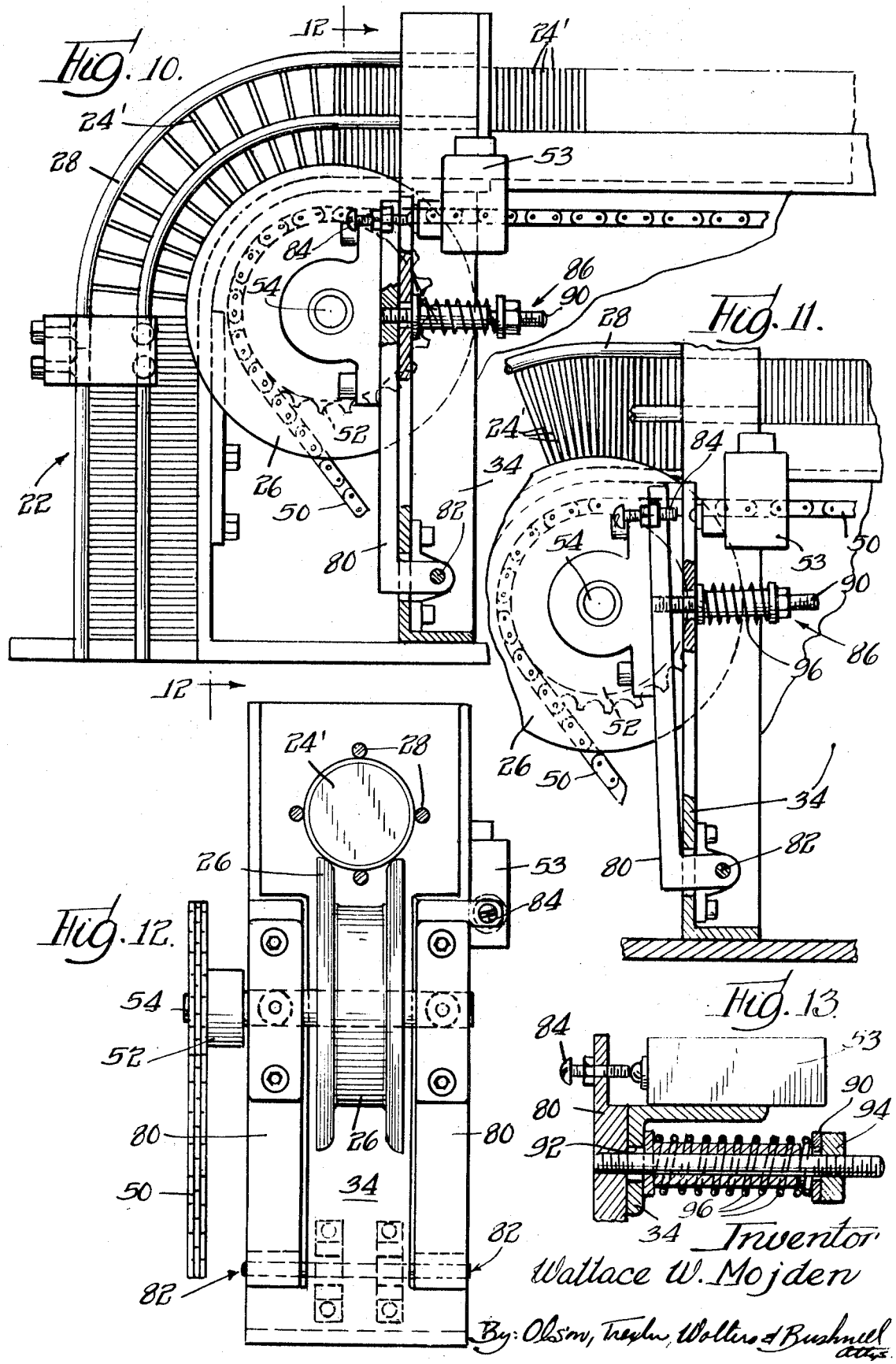

CONVEYOR ASSEMBLY

BACKGROUND OF THE INVENTION

The present invention relates generally to conveyor or transfer apparatus for delivering articles to a work station of a machine. More particularly, with reference to the accompanying drawings, the invention is disclosed in conjunction with transfer apparatus for conveying container ends to a machine wherein they will be assembled to the end portions of a container body.

In the assembly of containers, the end elements are normally fed to the assembly machine by means of a gravity chute and then applied to the ends of container body elements. These machines are often referred to in the art as "seamers" or end closure machines.

Due to the fact that the entry portion of these gravity chutes is generally a considerable distance off the floor—a matter occasioned by the normal height of the machine and the length of the chute—it is impractical to manually load these chutes. Accordingly, conveyors have been developed which supply the container ends to the chutes. In order to supply the gravity chute at a rate corresponding to that of the end closure machine, it is necessary to transport said ends with their planar surfaces in substantially vertical juxtaposition. However, the end closure machines normally require that the container ends be supplied with their planar surfaces in substantially horizontal juxtaposition; accordingly their orientation must be changed upon introduction into the gravity chute. This reorientation of the container ends is normally achieved by means of a roller or wheel which will engage and remove the container ends from the linear conveyor track, and then transport them along a portion of the periphery of said wheel until said container ends are fed to the gravity chute in the proper orientation.

While the prior art systems have proven generally satisfactory during normal operation, viz., where the viz, is using the container ends at approximately the same rate they are being supplied, certain problems have been encountered during an overload situation. That is when the seamer is utilizing the container ends at a lesser rate than they are being fed into the gravity chute. When this occurs the container ends back up and spill over the chute onto the conveyor and the machine, resulting in damage to either or both.

In practice, it is desirable to have adequate supplies of container ends in the gravity chute at all times. Accordingly, maximum efficiency can be assured and the danger of damage due to overflow obviated by providing an arrangement wherein the supply of container ends is regulated as a function of the amount of said ends in the gravity chute. One such arrangement for effecting this end result is illustrated in U.S. Pat. application Ser. No. 599,460, filed on Dec. 6, 1966, now Pat. No. 3,417,853, in which applicant herein is a joint inventor. The present invention is an improvement thereover.

SUMMARY OF THE INVENTION

Accordingly, it is one of the primary objects of the present invention to provide conveyor or transfer apparatus which obviates the problems discussed above. More particularly, it is an object of the present invention to provide transfer apparatus wherein the drive means for the conveyor system is deenergized once the level of container ends in the gravity chute reaches a certain level. Still another object of the present invention is to provide a novel arrangement associated with the end rollers of a conveyor system for automatically energizing and deenergizing the drive for said system depending upon the level of the container ends in the gravity chute.

The above noted objects are realized by providing means in association with the conveyor system to sense the level of container ends in the gravity chute and regulate the supply thereto, accordingly. Said means include a switch in circuit with the motor for the conveyor drive, and control apparatus associated with the end roller of the conveyor system and said switch, whereby when the drag on said end roller reaches a certain level said apparatus will actuate said end roller reaches a certain level said apparatus will actuate said switch to deenergize the motor; a decrease in the drag on said roller causing said control means to reenergize the conveyor drive motor.

Other advantages, objects and features of the present invention will be apparent from the following detailed description of the illustrated embodiments.

DESCRIPTION OF THE DRAWINGS

FIG. 1 is an elevational view of the discharge ends of a conveyor or transfer apparatus of the present invention, wherein the container ends are deposited in a gravity chute for subsequent use in a seamer or like assembly machine.

FIG. 2 is a sectional view taken along the lines 2-2 of FIG. 1, in the direction indicated.

FIG. 3 is a sectional view taken along the line 3-3 of FIG. 1, in the direction indicated.

FIG. 4 is an enlarged elevational view of the discharge end of the machine illustrated in FIG. 1, and showing the disposition of the disabling means of the present invention under normal operating conditions.

FIG. 5 is an elevational view similar to that of FIG. 4, but illustrating the disposition of the disabling means when the machine is operating under an overload condition.

FIG. 6 is a partial sectional view taken along the line 6-6 of FIG. 4, in the direction indicated.

FIG. 10 is a partial elevational view of the discharge end of apparatus of the type previously illustrated, wherein a modified form of disabling means is employed; said figure illustrating the elements in the normal operating condition.

FIG. 11 is a partial elevational view of a disabling means illustrated in FIG. 10, the elements being illustrated in the overload condition. FIG. 12 is a sectional view taken along the line 12-12 of FIG. 10, in the direction indicated.

FIG. 13 is a partial sectional view of the microswitch and spring arrangement employed in the disabling means illustrated in FIGS. 10 and 11.

DESCRIPTION OF THE ILLUSTRATED EMBODIMENTS

Figure 7:
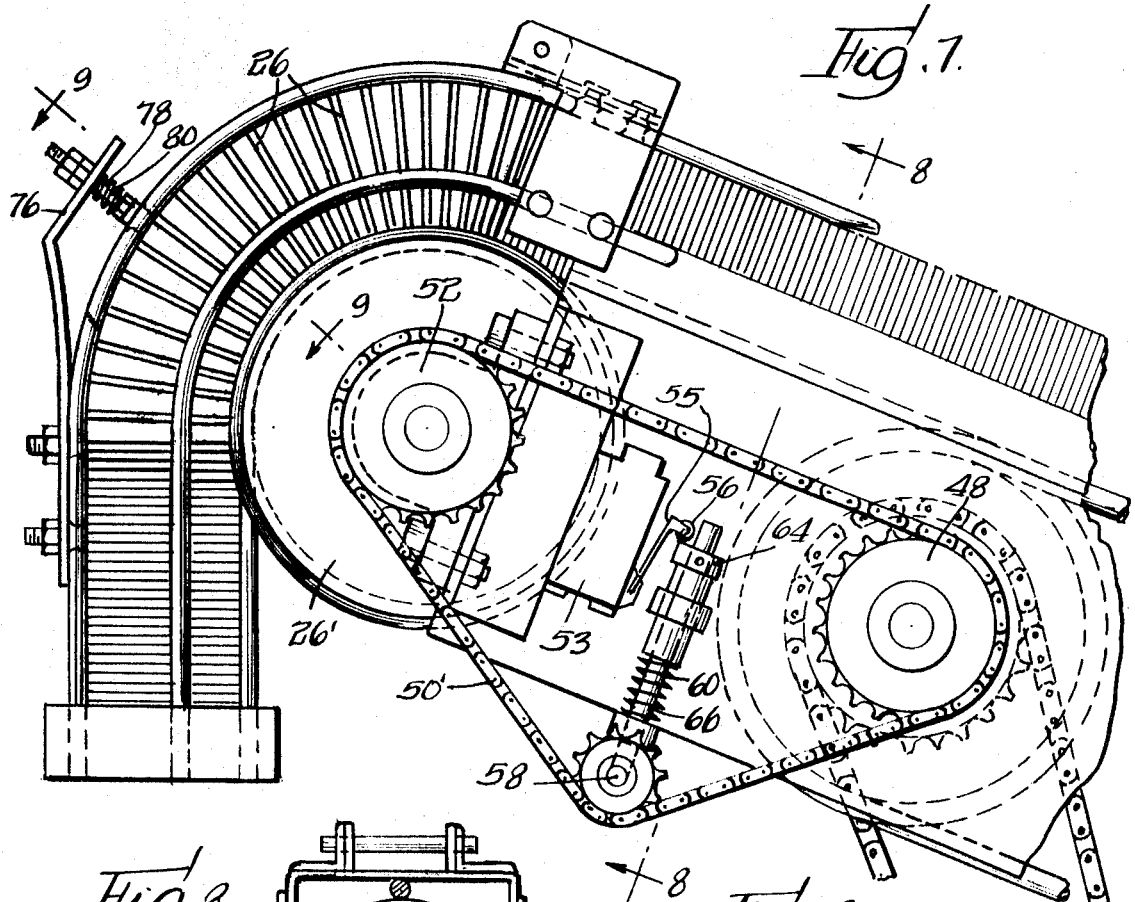
FIG. 7 is a partial elevational view of the machine illustrated in FIGS. 1 through 6 wherein the machine has been modified to accommodate circular container ends and employs a nonmagnetic type roller.

Referring now to the drawings, in FIG. 1 there is illustrated a conveyor or transfer apparatus embodying the present invention, said conveyor being designated generally 20. At the discharge end of the conveyor 20 there is provided a gravity chute 22 which is adapted to be placed in association with the work station of a seamer or similar type assembly machine (not shown).

The container ends 24 are moved along the length of the conveyor 20 by a belt arrangement, with their planar surfaces in substantially vertical juxtaposition. The container ends 24 will advance until they engage a magnetic roller 26 which is of a type known in the art, and then said ends are transported about the periphery of said roller until they are deposited in the gravity chute 22. As can be seen, once so deposited in the gravity chute 22 the planar surfaces of the container ends 24 are in horizontal juxtaposition, thus readying them for use by the end closure machine (not shown).

The gravity chute 22 is composed of a plurality of rodlike members 38 which are positioned with respect to each other to define a chute or track corresponding to the shape of the particular container ends being fed to the assembly machine. This particular arrangement is best illustrated in FIGS. 1 and 3, and it is to be understood that this construction may be adjusted to accommodate container ends of varying shape.

The belt arrangement which advances the container ends 24 to the roller 26 is comprised of a plurality of rollers 30 linked by flexible elastomeric belts or bands 32. The rollers 30 are carried within and mounted to the conveyor frame 34, which also carries the end roller 26, and may carry gravity chute 22. The configuration of the upper surface of frame 34, as shown in FIG. 2, is such that it defines an elongate channel 36 corresponding in shape to the container ends 24 and having the conveyor belts 32 disposed therein. Accordingly, as the rollers 30 rotate in a clockwise direction, as viewed in FIG. 1, the conveyor belts 32 will transport container ends 24 along the length of the frame in the direction indicated by arrow 35.

End roller 26 is only partially received within the confines of frame 34, as seen in FIG. 1, such that track 36 is disposed approximately tangential to the periphery of said end roller. Accordingly, end roller 26 will engage the lower portion or edge of the container ends 24 as they are discharged from the track 36, and due to the magnetic field set up thereby, the metal container ends 24 will be transported about the periphery of said roller until they are deposited in the gravity chute 22. The magnetic roller 26 is constructed somewhat similar to the roller disclosed in U.S. Pat. application Ser. No. 501,927, filed on Oct. 22, 1965 by Messrs. Mojden and Chivas, the former being the applicant herein.

Turning again to FIG. 1, there is also illustrated the drive arrangement for the entire conveyor apparatus, that is for end roller 26 as well as for the conveyor rollers 30. In the illustrated embodiment, the roller 30 closest to end roller 26 is driven by means of sprocket gear 40, sprocket chain 42, transmission 44, and motor 46. The additional rollers 30 spaced rearwardly thereof are in effect idler rollers and are driven by the elastomeric belts 32. Regarding the end roller 26, the axle which carries sprocket gear 40 also carries a sprocket gear 48, which is associated with end roller 26 by means of a section of sprocket chain 50 and sprocket gear 52 carried on the axle for end roller 26, said axle being designated 54. Thus, from the foregoing discussion it is believed that the drive arrangement for the conveyor apparatus can be clearly understood, and it should be kept in mind that the illustrated arrangement is in no way intended to limit the invention, as variations thereof may be employed to effect the same end results.

Considering now the present invention, attention is directed to FIGS. 4 and 5 which, as compared to FIG. 1, are enlarged illustrations of the forward or discharge end of the conveyor apparatus 20. In this regard, FIG. 4 illustrates the normal operating condition of the apparatus, while FIG. 5 illustrates an overload condition.

As was discussed previously, one of the problems encountered with apparatus of this type is that in a situation where the end closure machine (not shown) is not utilizing the container ends 24 as fast as they are being fed into the chute 22, the chute will become full and the container ends will spew from the conveyor track resulting in the possibility of damage to the machine and/or the conveyor apparatus 20.

Regarding the conveyor apparatus 20 illustrated in the accompanying drawings, it should be noted, that if the container ends 24 are being utilized at a rate equal to or slightly less than the rate at which the end roller 26 is depositing said ends in gravity chute 22, roller 26 will be unhindered and able to rotate freely. On the other hand, due to the magnetic nature of roller 26 and the engagement therewith of said container ends, when said ends 24 back up in chute 22 they will place a drag or retarding force on said roller. Accordingly, as the drag on roller 26 increases, it results in a corresponding increase in the force required to drive said roller. With respect to the present invention, disabling means are provided which sense this increase in the force required to drive the end roller 26, and when the drag on said roller reaches a determinable level, the drive means for the conveyor apparatus is deenergized, and then reenergized once the drag or retarding force on roller 26 decreases.

More specifically, in the embodiment illustrated in FIGS. 1 through 9, the disabling arrangement for the drive means includes a microswitch 53 which is placed in circuit with motor 46 and is carried by the conveyor frame 34. Microswitch 53 includes a pivotal actuator arm 55 having a cam follower-type roller 56 carried on the free end thereof. Also, mounted to frame 34 is an idler sprocket gear 58. The mounting for idler gear 58, as shown in FIG. 6, is provided by an L-shaped shaft 60 which is slidably carried in the bore 61 of a bracket member 62, which bracket member 62, in turn, is also mounted to frame 34. The shaft 60 is maintained in slidable engagement with the bracket 60 by means of a cam member 64 positioned on the upper end thereof by means of a setscrew 65. In addition, the mounting for idler gear 58 also includes a spring 66 which is positioned about shaft 60 and engaged between the lower edge of bracket 62 and an annular flange formation 63 carried on the lower portion of said shaft 60. Accordingly, it can be seen that the spring 66 will bias the shaft 60 and its associated idler gear 58 downwardly to the position illustrated in FIG. 6.

Referring specifically to FIG. 4, it can be seen that the lower or drive section 50' of sprocket chain 50 is engaged over idler gear 58. Thus, when there is an increase in tension in said section 50', as occasioned by an increase in the drag placed on roller 26, this tension will move the idler gear 58 upwardly, against the action of spring 66. When this occurs, due to the association of shaft 60 with said idler gear 58, it will cause the cam member 64 to engage and move the actuator arm 55 from the position of FIG. 4 to the position illustrated in FIG. 5. Thus, remembering that microswitch 53 is in circuit with the motor 46, this movement of said actuator arm will deenergize the motor to discontinue supply of the container ends 24 to chute 22 for the time being.

However, as the end closure apparatus (not shown) use up the container ends 24 in said chute 22, the drag or retarding force on roller 26 will decrease which in turn results in decrease in the tension in sprocket chain 50. Thus, due to the force exerted by spring 66 idler gear 58 will return to its normal position, as shown in FIG. 4, thereby again energizing motor 46 to commence feeding of the container ends to chute 22. Thus, it is believed clear that means are provided which regulate the supply of container ends to chute 22. Also, it should be noted that by adjustment of the force required to compress spring 66, the amount of drag resulting in deenergizing of motor 46 may be predetermined; adjustment in said force is provided for by the slidable nutlike member 63.

Figure 8:
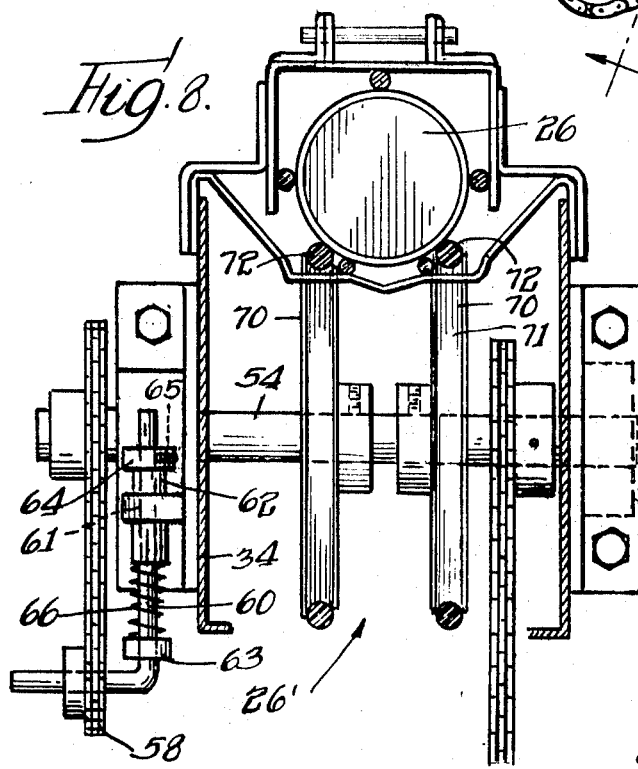
FIG. 8 is a sectional view taken along the line 8-8 of FIG. 7, in the direction indicated.
Figure 9:
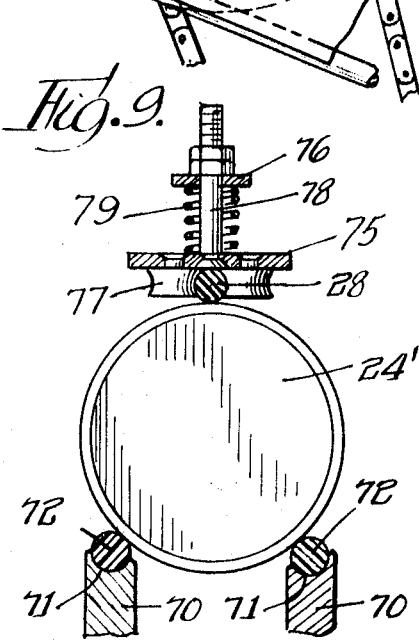
FIG. 9 is a sectional view taken along the line 9-9 of FIG. 7, in the direction indicated.

In FIGS. 7 through 9, there is illustrated an alternate embodiment of the conveyor apparatus discussed heretofore. The particular embodiment of said FIGS. 7—9 employs the same disabling means as previously discussed, and accordingly identical elements have been given like reference characters, while similar or equivalent elements have been given primed reference characters. The primary differences between the two embodiments are that the embodiment of FIGS. 7—9 is set up to handle circular container ends and also employs a different end roller construction, as compared to the magnetic end roller 26. In all other respects, the operation of this embodiment is the same as discussed previously.

The roller arrangement of this embodiment is designated 26', and functions substantially in the same manner as the magnetic roller 26. Said roller 26' is comprised of a pair of disclike members 70 that are journaled on axle 54. Each of said disclike members 70 is provided with an arcuate channel in the periphery thereof, and an annular elastomeric element positioned therein. Accordingly, with regard to FIG. 8, as the circular container ends 24' leave the track 36' they will be engaged by said elastomeric rings 72 and transported about the periphery of the end roller 26' and deposited in the gravity chute 22.

However, since the end roller arrangement 26' is not magnetic, it is desirable to provide means for assuring engagement of the container ends 24' with said end roller assembly. This engagement is provided by means of the biasing arrangement illustrated in FIGS. 7 and 9. In this regard, the rod elements 28 which define the gravity chute 22 are free flexing with the radially outermost one thereof being biased inwardly into engagement with the container ends 24' to positively force same into engagement with the elastomeric elements 72 of the end roller arrangement 26'.

To provide for the biasing of the rod elements 28, the gravity chute 22 is provided with a cantilever arm 76 which slidably carries a shaft 78. Said shaft 78 has, on the inner ends thereof, a plate 75 which carries a pair of capstanlike members 77 engaged about a rod 28. In addition, disposed between arm 76 and plate 80, about said rod 78, is a spring 79 which biases the rod 28 inwardly into engagement with the container ends 24'.

Since the operation of the disabling means illustrated in FIGS. 7 through 9 is identical to that previously discussed, further elaboration in this regard is deemed unnecessary and said prior discussion is incorporated herein by reference.

Turning now to FIGS. 10 through 13, there is illustrated still a third form of the present invention. This embodiment differs from the two previously discussed primarily in the elements of the disabling means. Accordingly, elements of the conveyor apparatus previously identified have been given like reference characters. In addition, it should be noted that this embodiment has been set up, similar to the embodiment of FIGS. 7—9, to handle circular container ends 24', although it employs a magnetic end roller 26. Quite obviously, the interchangeability of these various elements and features is a mere matter of choice and further elaboration in this regard is deemed unnecessary.

More specifically, with this embodiment, the end roller 26 is carried on a shaft or axle 54 which also carries sprocket gear 52. However, shaft 54 is journaled or carried by a mounted bracket arrangement, comprised of a pair of standards 80 pivotally mounted to frame 34 at 82.

One of said standards or arms 80 carries detent means, in the form of a setscrew 84, which is engaged with a microswitch 53. In addition, a spring biasing arrangement, designated generally 86, is also provided which tends to bias the arm standards 80 and the associated roller 26 to the position illustrated in FIG. 10, with said setscrew 84 engaging microswitch 53. In this position, the microswitch 53 is closed and motor 46 is energized to move the conveyor apparatus and supply container ends to chute 22.

Accordingly, as was discussed previously, when the container ends 24' start to back up in chute 22 the tension in sprocket chain 50 increases due to an increase in the drag on roller 26. This increase in tension results in a moment being placed on the mounting arrangement, and there is a tendency for the roller 26 and said mounting arrangement to be pivoted in a counterclockwise direction to the position illustrated in FIG. 11. As can be seen, upon pivotal movement to this position, the setscrew 84 is disengaged from microswitch 53, whereby the drive motor 46 will be deenergized to momentarily discontinue supply of the container ends to chute 22. Once the level of the container ends 24' in chute 22 drops, the spring arrangement 86 will bias the roller 26 back to the position illustrated in FIG. 10, with the setscrew 84 again engaging microswitch 53, which in turn energizes the drive motor 46 to again commence supply of the container ends 24' to said gravity chute 22.

In FIG. 13, the construction of the spring biasing arrangement 86 is illustrated in detail. In this regard, the arm 80 carries a shaft 90 which is passed through an aperture 92 in frame 34. The distal end of shaft 90 is threaded and has a nut 94 engaged thereon. Disposed between nut 94 and the frame 34 is a spring element 96 which, as can be seen, tends to bias the arm 80 to the illustrated position. As is apparent, from FIG. 13, movement of the nut 94 along the length of the shaft 90 can be employed to determine the amount of force required to move the arm 80 to the disabling position of FIG. 11.

It is envisioned that other structural modifications and/or alternate embodiments other than those illustrated may occur to one skilled in the art, while retaining the essential concepts of the present invention. Accordingly, the illustrated and described embodiments are to be considered as purely exemplary of said invention and not as limiting same in any sense; the scope and spirit of the invention being defined by the claims appended hereto.

What I claim is:

1. Transfer apparatus for supplying objects to an operating station, said transfer apparatus comprising:
    conveyor means including a frame, a roller carried by said frame which is operable to facilitate the movement of said objects; drive means operatively coupled with said roller and including a motor and an endless drive chain for transmitting power from said motor to the driven element; and overload disabling means associated with said drive means and responsive to drag placed on said roller by the accumulation of objects at said operating station to regulate the supply of objects thereto, said overload disabling means including a switch in circuit with said motor, and control means responsive to excessive drag on said element and operable to actuate said switch thereby energizing and deenergizing said motor in accordance with the drag placed on said element, said control means including an idler sprocket over which a lower reach of said drive chain is engaged, an L-shaped shaft having said idler sprocket mounted thereon and being slidably supported by a bracket affixed to said frame, a flange positioned on said shaft at a point spaced below said bracket, a spring member in surrounding engagement with said shaft and disposed between said bracket and said flange, wherein said spring tends to bias said idler sprocket to a first position, with said drag creating tension in the lower reach of said chain which is operable to displace said idler sprocket upwardly toward a second position against the force of said spring, a cam member carried by an upper portion of said shaft and engageable with said switch whereby said motor will be energized when said idler sprocket is in the first position and will be deenergized upon displacement of said idler sprocket toward said second position, said spring means returning said idler sprocket to the first position once the drag on said roller is reduced.

UNITED STATES PATENT OFFICE
CERTIFICATE OF CORRECTION

Patent No. 3,595,372　　　　　　　Dated July 27, 1971

Inventor(s) Wallace W. Mojden

It is certified that error appears in the above-identified patent and that said Letters Patent are hereby corrected as shown below:

Column 1, line 39, change "viz," second occurrence to --seamer--

Column 2, lines 3,4, after "actuate said" delete "end roller reaches a certain level said apparatus will actuate said".

Column 5, line 12, change "80" to --75--.

In the references, change "Mouden" to --Mojden--.

Signed and sealed this 21st day of March 1972.

(SEAL)
Attest:

EDWARD M. FLETCHER, JR.　　　　　ROBERT GOTTSCHALK
Attesting Officer　　　　　　　　Commissioner of Patents